(12) United States Patent
Smith et al.

(10) Patent No.: US 9,152,139 B2
(45) Date of Patent: Oct. 6, 2015

(54) AUTOMATION CONTROL OF ELECTRONIC DEVICES

(75) Inventors: W. Eric Smith, Pleasant Grove, UT (US); James R. Gist, Draper, UT (US)

(73) Assignee: Control4 Corporation, Salt Lake City, UT (US)

(*) Notice: Subject to any disclaimer, the term of this patent is extended or adjusted under 35 U.S.C. 154(b) by 970 days.

(21) Appl. No.: 12/485,849

(22) Filed: Jun. 16, 2009

(65) Prior Publication Data

US 2010/0318198 A1    Dec. 16, 2010

(51) Int. Cl.
| G05B 11/01 | (2006.01) |
| G08B 5/22 | (2006.01) |
| G06F 3/00 | (2006.01) |
| H04N 7/20 | (2006.01) |
| H04N 7/18 | (2006.01) |
| G05B 19/042 | (2006.01) |
| G06F 3/02 | (2006.01) |

(52) U.S. Cl.
CPC .. *G05B 19/0428* (2013.01); *G05B 2219/23051* (2013.01); *G05B 2219/24097* (2013.01)

(58) Field of Classification Search
CPC ........... G05B 15/02; G05B 2219/2642; G05B 19/042; G05B 19/418; G05B 11/32; G05B 19/0421; G05B 19/0428; G05B 19/056; G05B 2219/13133; G05B 2219/13144; G05B 2219/13145; G05B 2219/13148; G05B 2219/2239; G05B 1/01; H03M 13/1102; H03M 13/15; H03M 13/1515; H03M 13/2957; G01R 29/0814; G06F 1/1637; G06F 21/10; G06F 21/602; G06F 3/0484; G06F 1/1626; G06F 1/1635; G06F 3/041; G06F 3/0482

USPC .......................... 700/17; 345/169; 340/815.6; 725/40–43, 72–85

See application file for complete search history.

(56) References Cited

U.S. PATENT DOCUMENTS

| 4,445,137 | A | * | 4/1984 | Panofsky ....................... 382/302 |
| 4,710,917 | A | * | 12/1987 | Tompkins et al. ............ 709/204 |
| 5,101,354 | A | * | 3/1992 | Mowers et al. ................. 700/92 |
| 5,118,105 | A | * | 6/1992 | Brim et al. ....................... 473/58 |
| 5,706,334 | A | * | 1/1998 | Balk et al. ................... 379/88.13 |
| 5,724,091 | A | * | 3/1998 | Freeman et al. .............. 725/138 |
| 5,801,789 | A |   | 9/1998 | Zeidler et al. |
| 5,864,481 | A | * | 1/1999 | Gross et al. ..................... 700/90 |

(Continued)

OTHER PUBLICATIONS

Blaster et al., "Constant Quality Rate Control for Content-Based 3D Wavlet Video Communication", IEEE, 2002, pp. 2056-2060.*

(Continued)

*Primary Examiner* — Robert Fennema
*Assistant Examiner* — Thomas Stevens
(74) *Attorney, Agent, or Firm* — Austin Rapp & Hardman (57) ABSTRACT

A system is provided for remote control of electronic devices. An automation controller can be used to control electronic devices via a network. A communication port for the automation controller is used to provide control signals for at least one electronic device via the network. An analog receiver module receives analog video signals from analog sources. A digital display module can receive a digital control interface from the automation controller. The digital control interface can include automation graphical interface controls. A display module, coupled to the automation controller, is used to composite the digital control interface received from the digital display module into a composite image with analog video signals.

17 Claims, 4 Drawing Sheets

(56) References Cited

U.S. PATENT DOCUMENTS

| | | | |
|---|---|---|---|
| 5,889,506 A * | 3/1999 | Lopresti et al. | 345/158 |
| 6,181,334 B1 * | 1/2001 | Freeman et al. | 725/138 |
| 6,282,451 B1 * | 8/2001 | White | 700/22 |
| 6,543,052 B1 * | 4/2003 | Ogasawara | 725/60 |
| 6,640,337 B1 * | 10/2003 | Lu | 725/39 |
| 6,792,319 B1 * | 9/2004 | Bilger | 700/13 |
| 6,952,617 B1 * | 10/2005 | Kumar | 700/1 |
| 7,373,650 B1 * | 5/2008 | Rodriguez et al. | 725/41 |
| 7,623,753 B2 * | 11/2009 | Farnan et al. | 386/200 |
| 7,627,386 B2 | 12/2009 | Mo et al. | |
| 7,865,252 B2 * | 1/2011 | Clayton | 700/19 |
| 7,917,661 B2 * | 3/2011 | Bavor et al. | 710/8 |
| 8,026,928 B2 * | 9/2011 | Takano et al. | 345/619 |
| 8,316,302 B2 * | 11/2012 | McKoen et al. | 715/728 |
| 2001/0016947 A1 * | 8/2001 | Nishikawa et al. | 725/51 |
| 2001/0021998 A1 * | 9/2001 | Margulis | 725/81 |
| 2002/0059637 A1 * | 5/2002 | Rakib | 725/119 |
| 2002/0080188 A1 * | 6/2002 | Somashekaraiah | 345/810 |
| 2002/0131768 A1 * | 9/2002 | Gammenthaler | 386/107 |
| 2002/0152289 A1 | 10/2002 | Dube | |
| 2003/0043260 A1 * | 3/2003 | Yap et al. | 348/14.06 |
| 2003/0056012 A1 * | 3/2003 | Modeste et al. | 709/249 |
| 2003/0081131 A1 * | 5/2003 | Farnan et al. | 348/211.11 |
| 2003/0169234 A1 * | 9/2003 | Kempisty | 345/158 |
| 2003/0195998 A1 | 10/2003 | Estrop | |
| 2004/0059782 A1 * | 3/2004 | Sivertsen | 709/204 |
| 2004/0117858 A1 * | 6/2004 | Boudreau et al. | 725/144 |
| 2004/0151218 A1 * | 8/2004 | Branzoi et al. | 372/25 |
| 2004/0173671 A1 * | 9/2004 | Ferraro | 235/379 |
| 2004/0260415 A1 | 12/2004 | Weiss | |
| 2005/0134547 A1 * | 6/2005 | Wyatt | 345/102 |
| 2005/0177252 A1 * | 8/2005 | Chernoff et al. | 700/17 |
| 2006/0092133 A1 * | 5/2006 | Touma et al. | 345/158 |
| 2006/0109854 A1 * | 5/2006 | Cancel | 370/401 |
| 2006/0250578 A1 * | 11/2006 | Pohl et al. | 351/210 |
| 2006/0279758 A1 | 12/2006 | Myoki | |
| 2007/0142022 A1 * | 6/2007 | Madonna et al. | 455/352 |
| 2008/0001773 A1 * | 1/2008 | Rye et al. | 340/825.22 |
| 2008/0127065 A1 * | 5/2008 | Bryant et al. | 717/109 |
| 2008/0183307 A1 * | 7/2008 | Clayton et al. | 700/8 |
| 2008/0183316 A1 * | 7/2008 | Clayton | 700/90 |
| 2008/0244405 A1 * | 10/2008 | Kimura | 715/716 |
| 2008/0281592 A1 * | 11/2008 | McKoen et al. | 704/235 |
| 2009/0309830 A1 * | 12/2009 | Yamamoto et al. | 345/156 |
| 2010/0205528 A1 * | 8/2010 | Bavor et al. | 715/259 |

OTHER PUBLICATIONS

PCT Application PCT/US2010/038788; filed Jun. 16, 2010; W. Eric Smith; International Search Report mailed Feb. 24, 2011, 10 pg.

Maxwell, Adrienne, hometheaterreview.com/.../uei_nevos . . . , UEI NevoS70 Universal Remote Control Reviewed, Oct. 12, 2008, 2 pages.

www.iautomate.com/mx3000.html, MX-3000 Remote Control, accessed Mar. 11, 2009, 6 pages.

Philips Streamium SL40 . . . , amazon.com, accessed Mar. 11, 2009, 9 pages.

hometheaterreview.com/.../monster_a . . . , Monster AVL300 universal remote control reviewed, Oct. 12, 2008, 2 pages.

bulogics.com/.../basecamp_complete . . . , BuLogics Home Automation—Light Y . . . products, accessed Mar. 11, 2009, 2 pages.

bulogics.com/.../partners_zwaveallian . . . , BuLogics Home Automation—Light Y . . . Partners The Z-Wave Alliance, accessed Mar. 11, 2009, 2 pages.

x10.com/.../ur73_ed_special_limit25_c . . . , X-10 universal remote with remote c . . . 25-kit limit: platinum universal remote with remote control lights kit, accessed Mar. 11, 2009, 6 pages.

astore.amazon.com/.../B001604QGW Dash Express GPS,—Pioneer AVH-P4000DVD 2-Din DVD multimedia AV Receiver, accessed Mar. 11, 2009, 4 pages.

incarexpress.co.uk/view_product.php? . . . , Kenwood KOS-V500 Advanced Integra . . . , accessed Mar. 11, 2009, 4 pages.

http://209.85.173.132/search?q=cach . . . , Kenwood DVD 2 Din, accessed Mar. 11, 2009, 6 pages.

www.geodatasys.com/dv7400.htm, GeoData Systems Management Inc., 2nd Generation INdustrial DVD-Video Player, accessed Mar. 11, 2009, 4 pages.

Taraszka, Ken, hometheaterreview.com/.../harmony_ . . . , Harmony 1000 Universal Remote Control Reviewed, Oct. 11, 2008, 2 pages.

Taraszka, Ken. hometheaterreview.com/.../harmony_ . . . , Harmony One Universal Remote Control Reviewed, Oct. 12, 2008, 2 pages.

Kahn, Brian, hometheaterreview.com/.../universal_ . . . , Universal Remote Control MX-980 Reviewed, Nov. 26, 2008, 2 pages.

Maxwell, Adrienne, hometheaterreview.com/.../philips_pr . . . Philips Pronto TSU9400 Universal Remote Control Reviewed, Oct. 12, 2008, 2 pages.

* cited by examiner

AUTOMATION CONTROL OF ELECTRONIC DEVICES

BACKGROUND

The price of electronic devices has continued to decrease dramatically. The variety of consumer electronic components and automation electronics that can be purchased has continued to increase. For example, digital video recorders, DVD players, large screen TVs, multi-carousel CD players, MP3 players, video games consoles and similar consumer electronic items have continued to drop in price and become more widely available. Other examples of home electronics that are widely available include: remotely controlled light switches and dimmers, wireless networks, wireless power controls, wireless switches, remote controlled fireplaces, garage doors and even appliances. The decreases in price and increased availability have made home audio, home video, and automation electronics more available to end users.

The availability of electronic equipment has also increased consumer interest in networking such devices together. It has become easier and less expensive to buy many networkable components that can be used to control lighting, monitor appliances, access environmental controls, and provide high quality audio-visual entertainment through broadcast television, satellite programs, cable programs, and internet connections for an automation network.

The increasing availability of wireless networks has enabled a wide variety of devices to be centrally controlled through the use of wireless automation networks. However, even with the ever increasing availability of wireless networks, automation networks are still only installed in limited numbers.

Remote controls used to remotely control fixtures, devices, etc., have proven to be expensive, as well as difficult to program and use. Remote controls are often operable through either radio frequency or an infrared link to transmit control signals to the device to be controlled. More recent developments allow the use of Bluetooth® wireless technology and other technologies and methods for remote control signaling and operation. Each manufacturer of a controllable device usually provides its own remote control apparatus for the device to be controlled. The proliferation of remote controls further complicates their usage as the homeowner becomes confused as to how each remote control device operates or how the control device is to be programmed.

Some manufacturers provide a universal remote control device that is operable to control the operation of more than one electrical or electronic device. By properly programming such a universal remote control device, the remote control can provide the proper control signals to effectuate the remote control of at least two devices. However, universal remote control devices are known to be difficult to program and confusing to use.

Typical remote controls are often based on a button-centric paradigm and usually contain a large number of buttons and/or a liquid crystal display (LCD) screen. This can cause a crowded layout which in turn can lead to considerable confusion and intimidation. Users may have difficulty finding a desired button. Often the lighting is dim in a room in which the remote control is used. This can make it difficult to read the legends on the crowded button layout. The success of remote control devices has been limited at least in part by the inclusion of a large number of buttons or use of an LCD screen which results in increased complexity and a higher cost.

SUMMARY

A system is provided for remote control of automation devices. An automation controller can be used to control automation devices via a network. A communication port for the automation controller is used to provide control signals for at least one automation device via the network. An analog receiver module receives analog video signals from external analog sources. A digital display module can receive a digital control interface from the automation controller. The digital control interface can include automation graphical interface controls. A display module, coupled to the automation controller, is used to composite the digital control interface received from the digital display module into a composite image with analog video signals.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENTS

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless otherwise provided, as used herein, "automation device" can refer to any type of device which can be controlled, such as by an electronic or other type of signal from another device configured to control the automation device. Examples of automation devices include audio devices, video devices, lights, home appliances, networks and network devices, heating and cooling systems, etc. Virtually any electronic device may be an automation device since electronic devices can be controlled by control signals, by adjusting a voltage level supplied to the device, etc.

A communication network in a control system provides the communication channels that allow the control system to manage connected devices. The communication network may be used for: configuration of devices in communication through the network, sending commands to the disparate devices, and receiving status information from the devices.

Figure 1:
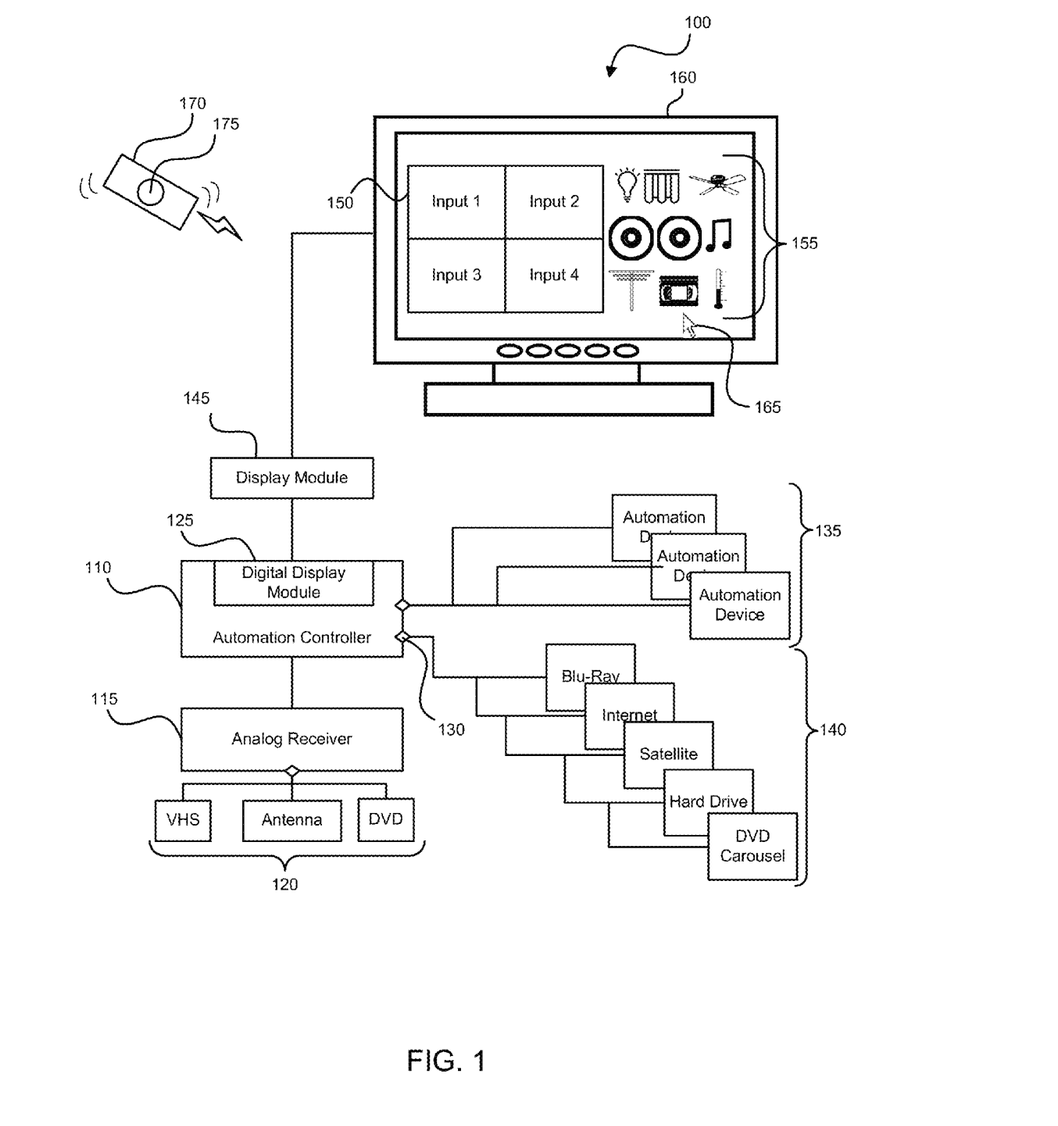
FIG. 1 is a block diagram of a system for remote control of automation devices in accordance with an embodiment.

Referring to FIG. 1, an embodiment of a system 100 for remote control of automation devices is shown. The system includes an automation controller 110. The automation controller can be configured to control automation devices via a network. As described above, the network may include one or more communication channels that allow control or management of connected devices. Devices may be connected to each other, to the automation controller, or to other system components to form the network. The connections or communications channels may be wired or wireless. The automation controller can be configured to send control signals to automation devices and other devices. The control signals may be electronic or other signals sent to devices to control or operate the devices. The control signals may receive feedback in response. The devices may communicate with the automation controller via control signals. The system may include one or more communication ports 130 through which wired or wireless signals may be sent to and received from devices on the network. The communication ports can be physical ports or software ports. A physical or hardware a port can serve as an interface between the system and other network or automation devices. A software port can be a virtual or logical data connection that can be used by hardware or software to exchange data across a network or mesh network.

The system 100 shown in FIG. 1 can include an analog receiver module 115. The analog receiver module can receive analog signals, such as video signals, from analog sources 120. The analog receiver module may be configured to receive analog signals from one or more analog sources. The analog sources can be external or internal to the system. An internal analog source may be one that is integrally formed with the system. For example, at least some portions of the system of FIG. 1 may be formed as a single unit. An analog source, such as a video tape player, may be a part of the unit. The video tape player would be an internal source. An external analog source may be an analog source not formed integrally with the system. For example, an antenna or a video tape player that is connected to the system by a cable may be considered external analog sources. The analog receiver can be an integrated part of the automation controller 110, or maybe a separate component in communication with the automation controller.

Some example sources of analog video signals include but are not limited to: an antenna, a video tape player, an optical disc player, a Digital Video Disc (DVD) player, cable TV, satellite programming, etc. It will be appreciated that some sources, such as a DVD player, may provide an analog source because a video signal is outputted from an analog port. However, a DVD player may also provide a digital output for digital video signals if the video signal is output from a digital port.

In one aspect, digital video signals are not sent through the analog receiver but are rather sent to the automation controller. Digital video sources 140, like analog sources, may be internal or external to the system in the same manner as an analog source may be internal or external to the system as described above. Some examples of digital video sources include, but are not limited to, a Blu-ray Disc® player, satellite video signals, video retrieved from a hard drive or on the internet, a DVD player, etc. Automation devices 135 may likewise be internal or external to the system, and can be sent to the automation controller.

The system 100 of FIG. 1 includes a digital display module 125. While depicted in FIG. 1 as being a part of the automation controller 110, the digital display module may alternately be a separate component from the automation controller. The digital display module can receive a digital control interface from the automation controller. The digital control interface includes automation graphical interface controls. As used herein, "automation graphical interface controls" refers to options on a graphical user interface which can be selected or manipulated by a user to manage automation devices, such as by controlling the devices, sending signals to the devices, receiving feedback from the devices, etc. In another embodiment, the digital display module may be a part of the display module 145 discussed below. In yet another embodiment, the digital display module, the display module and the automation controller may comprise a single unit capable of performing the functions associated with each component as described herein. The digital display module is in communication with the display module.

Figure 2A:
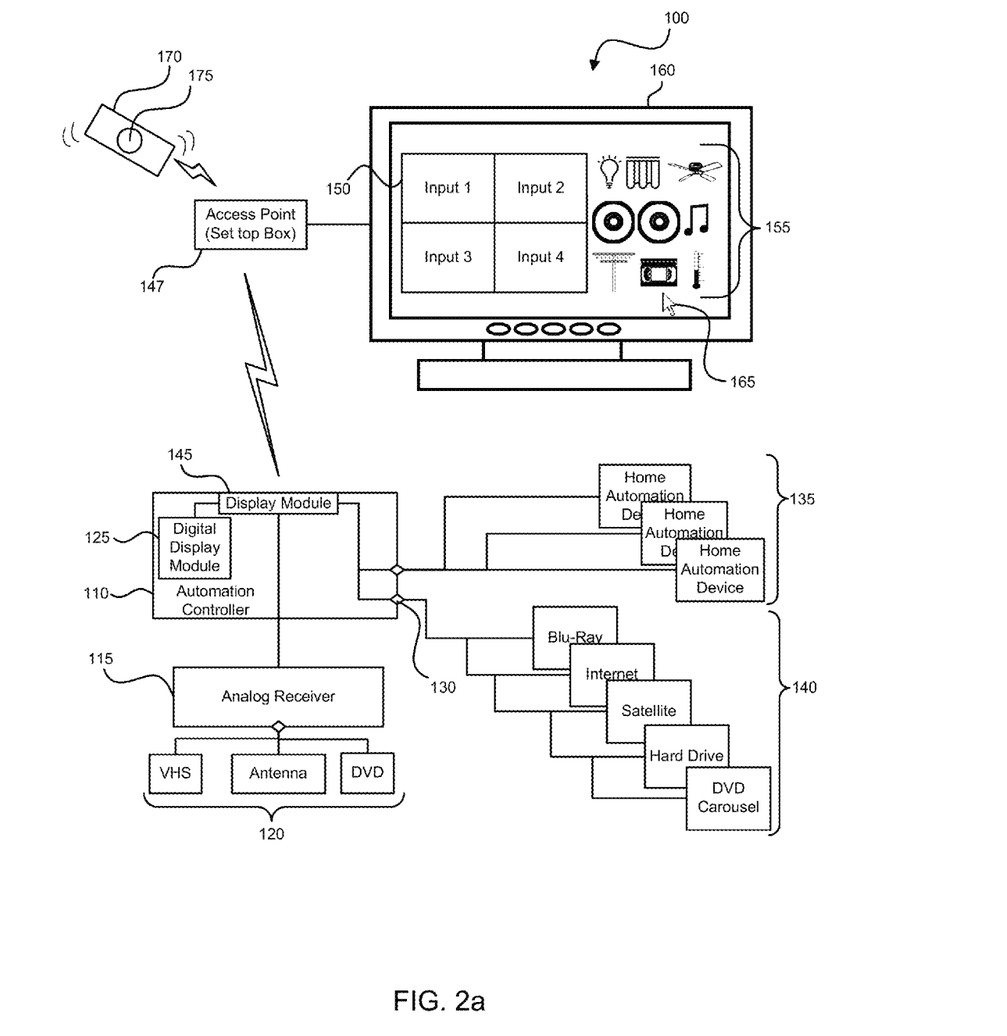
FIG. 2a is a block diagram of a system for remote control of automation devices, wherein a display module is formed integrally with an automation controller in accordance with an embodiment.

The display module 145 is coupled to the automation controller 110 either directly or indirectly. The display module can be configured to composite the digital control interface received from the digital display module into a composite image with analog video signals. The display module may be configured to receive digital and analog video signals directly from the digital and/or analog sources, or may receive them indirectly after the signals have passed through the automation controller. FIG. 2a depicts the digital and analog signals being input to the display module. The line connecting the display module and the automation controller in FIG. 1 may also represent a plurality of signals, both analog and digital, being sent to the display module.

In the embodiment shown in FIG. 2a, the system 100 includes an access point 147. In one aspect, the access point may comprise a set top box. The access point may comprise a receiver for signals from a remote control 170. The access point may be configured to communicate signals received from the remote control to the display 160 and/or to the automation controller 110. The access point may communicate or send signals via wired or wireless connections. In one aspect, the access point may receive output from the display module 145 and send the output to the display. In another aspect, the display can receive output from the display module directly and the access point transmits signals from the remote control to the automation controller and the display. In one example, the remote control can be used to control the display directly (via the access point) and can be used to control various other devices through the automation controller (also via the access point). In another aspect, the access point may communicate only with the automation controller to send or receive signals from the remote control to the automation controller. The display module can then be used to composite a display image which can track or represent input from the remote control as will be further described below.

Figure 2B:
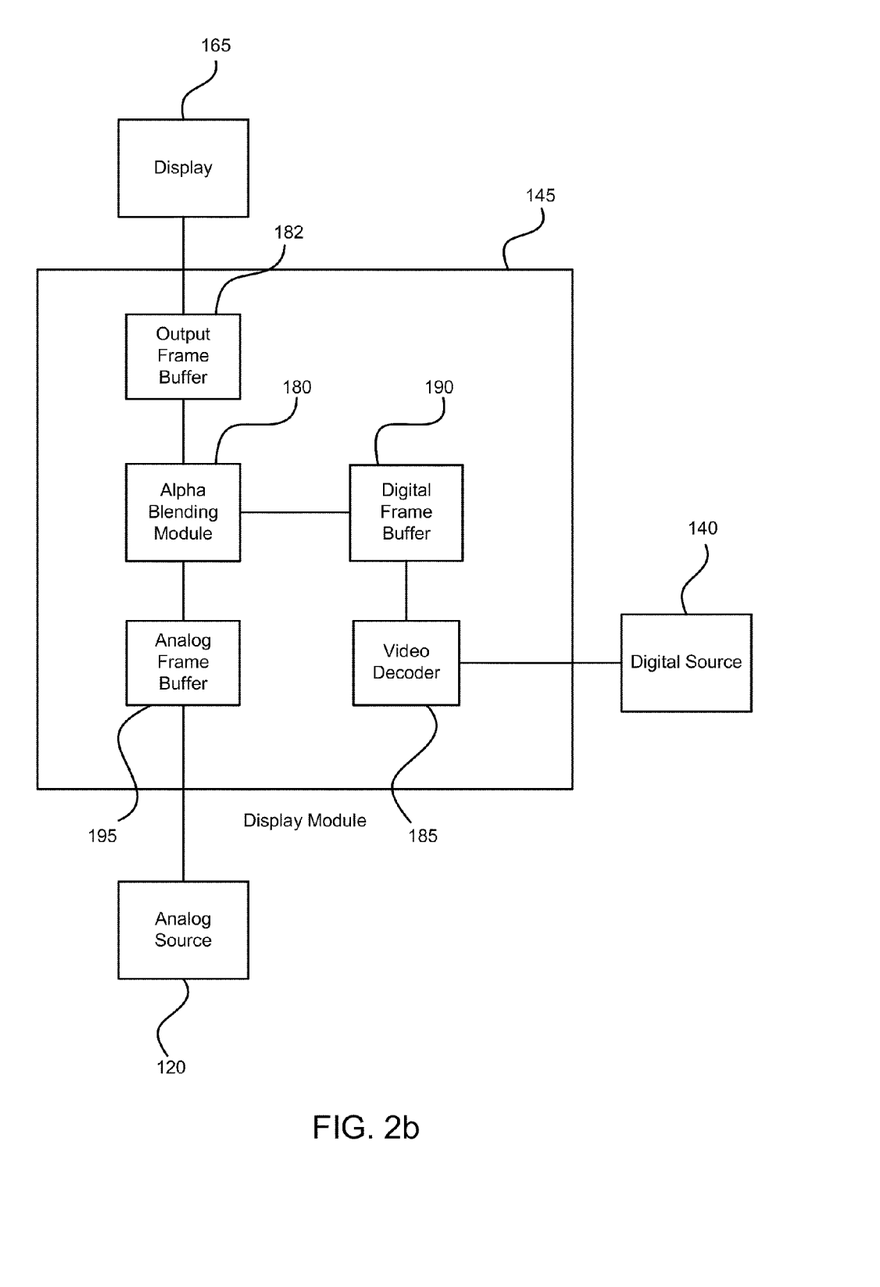
FIG. 2b is a block diagram of a display module for use in a system for remote control of automation devices in accordance with an embodiment.

Referring to FIG. 2b, a block diagram of a display module 145 in accordance with an embodiment is shown. The display module can receive digital and analog video signals from digital 140 and analog 120 sources. Compressed digital video sources maybe passed through a video decoder 185. The video decoder can use various video codecs to decode the video. A video codec is a device or software that enables video compression and/or decompression for digital video.

Analog sources may be passed through an analog frame buffer 195 and digital sources can be passed through a digital frame buffer 190. Frame buffers as used herein comprise memory that stores one or more frames of video information. The output of the analog and digital frame buffers can go to an alpha blending module 180. The alpha blending module can take a frame from the digital frame buffer and a frame from the analog frame buffer and create a composite blending of part or all of the frames with each other. The alpha blending module can adjust the transparency or alpha values of one or both frames to show one frame in the foreground or the background of the other frame at various levels of transparency. The alpha blending module can also blend frames without transparencies or backgrounds, such as by windowing signals from the different sources. The alpha blending module can blend multiple frame types from various sources. The alpha blending module can blend a digital control interface, digital video signals, analog video signals, etc. together at the same time. In one aspect, the alpha blending module may comprise an alpha blending buffer for each signal to be blended. The output from the alpha blending buffer may be sent directly to the display 160 to be viewed by a user. In one aspect, the display module may also include an output frame buffer 182 for buffering the output signal before sending the output to the display. The output frame buffer can be a screen video output device that drives a video display from a memory buffer containing a complete frame of data, and can store the contents of an image pixel by pixel.

In one aspect, the display module 145 (FIG. 1) overlays a digital signal, such as a graphical user interface (GUI) for control of automation devices, over an analog video signal. In another aspect, an analog video signal can be overlayed on a digital background. In yet a further aspect, the GUI may be wholly or partially overlayed on top of the analog signal which is in turn overlayed on a digital signal or background. As described above, the overlay may be varying degrees of transparency. To reduce user confusion, a topmost overlay may be opaque or just partially transparent. Transitions between inputs, control options, etc., may have different transparency levels during the transition than the transparency levels of menus or video signals during non-transition events.

Referring again to FIG. 1, an example composited control interface, such as may be shown on a display 160 is shown. The control interface may include any number of inputs. For example, in FIG. 1, four video windows 150 are shown. The windows can contain signals from any type of digital or analog source. For example, Input 1 may display a video signal from the video tape player. Input 2 may display a signal from an internet source. Input 3 may display a signal from an automation device, such as a security camera. Input 4 may display a signal from an antenna. All four signals may be shown in real-time or near real-time on the interface. It will be appreciated that fewer or greater numbers of signals may also be composited into the interface to show on the display. The number of signals displayed may also be user configurable.

The control interface can also include control options for various devices on the network or connected to the automation controller. In one aspect, the interface includes a graphic or menu item for one or more of all of the networked devices. FIG. 1 depicts example graphics 155 for lighting, curtains, a ceiling fan, multiple DVD sources (such as DVD and Blu-ray), an audio system, an antenna, a video tape player, and a thermostat. A user can select a desired device from the menu or the graphic, and be presented with various control options. For example, a user may select lighting and dim one or more lights connected to the network. The menu may include modes which can be configured by a user for various settings. For example, if the user wishes to watch a DVD video, the user may select a DVD video mode which may turn off music playing on an audio system (and may route DVD audio through the stereo system), dim the lights, close the curtains, set the video input source to DVD and begin playing a DVD in the DVD player.

As described, the display module 145 may provide an output to a display 160 for viewing by a user. The user may view the interface on the display to control the various network devices.

The system may use one or more remote controls 170 in communication with the automation controller. The automation controller includes a mechanism for communicating with the remote controller or for receiving communications from the remote controller. For example, the mechanism for communicating may be a wireless transceiver. Various wireless communications techniques are known which can be used in wireless transceivers, including for example, radio frequency, ultrasonic, optical, infrared, and ultraviolet transmission. Wireless transceivers for various communications techniques are known which can be used in embodiments of the present invention.

A control icon 165, such as a cursor, pointer, etc., may be used to assist a user in manipulating the interface displayed. The cursor may be controlled by the remote control 170. The remote control may be wired or wireless. For example, the remote control may comprise a wired computer mouse. As shown in FIG. 1, the remote control is wireless and motion-sensitive. Various types of motion-sensitive devices are known in the art. Some examples of motion-sensitive devices include devices based on gyroscopes, accelerometers, and infrared, etc. Any type of motion-sensitive device may be used to control the cursor. A motion-sensitive device, as used herein, refers to a device which tracks the motion of the device and translates that motion into movement data for a cursor, pointer, etc. on a display screen. As the motion-sensitive device moves up, down, right or left, a cursor would likewise move up, down, right or left with the motion-sensitive device.

In one embodiment, the motion-sensitive device is a handheld, user interface device which includes a plurality of accelerometers, each of which provide acceleration data associated with movement of the device. A processing unit transforms the acceleration data into data from which two dimensional cursor movement data can be generated. The processing unit processes the acceleration data to determine when the handheld, user interface device is stationary and can recalibrates the handheld, user interface device when the handheld, user interface device is stationary.

In one aspect, the user interface device can include a first rotational sensor for determining rotation of the pointing device about a first axis and generating a first rotational output associated therewith. A second rotational sensor can be used in determining rotation of the pointing device about a second axis and generating a second rotational output associated therewith. An accelerometer can be used to determine an acceleration of the pointing device and outputting an acceleration output associated therewith; and a processing unit for modifying the first and second rotational outputs based on the acceleration and for generating an output based on the modified first and second rotational outputs.

Operation of the system may proceed as follows. The user may be presented with a top level selection-type menu. The menu information is obtained from the display module. Movement of the remote control is communicated to the automation controller. The automation controller determines various menu items and configuration parameters to display on the menu. The automation controller can populate a list of devices to create the menu. In one aspect, the list may include text, graphics, or video.

The user can navigate the menu, for example by moving a cursor around on the displayed menu, such as up-down, side-side, scrolling, etc. In other words, the motion of the motion-sensitive remote control can be function mapped to a menu navigation function. Various other ways of displaying and navigating a menu list are possible and can be used in embodiments of the present invention.

Continuing the example, the user may navigate to the menu item "LIGHTS" and select that menu item by pressing a user interface actuator 175 or select button. In other words, the user interface actuator has been mapped to a menu selection function. For example, by selecting "LIGHTS" the user may be directed to a second menu display while allows selection of various lights in the current room. Upon selecting a particular light, e.g. "OVERHEAD" a control-type screen may be presented. Here, the user interface actuator has been mapped to a control selection function. Upon the user-selection of a particular light being controlled or selection of options for controlling the light, a signal can be sent to the automation device (the light, in this example) to control the device (such as by switching on the lights). Brightness of the overhead lighting can be increased or decreased using the user interface actuator, or by motion of the remote control 170. The display can also include an indicator showing the current status of the overhead lighting which is updated as the lighting level is changed, for example, using additional lines on the display. While the foregoing example was directed toward a lighting device, it will be appreciated that a similar process may be used for any type of automation or input device for manipulating the various functions and operations of the particular device.

Figure 3:
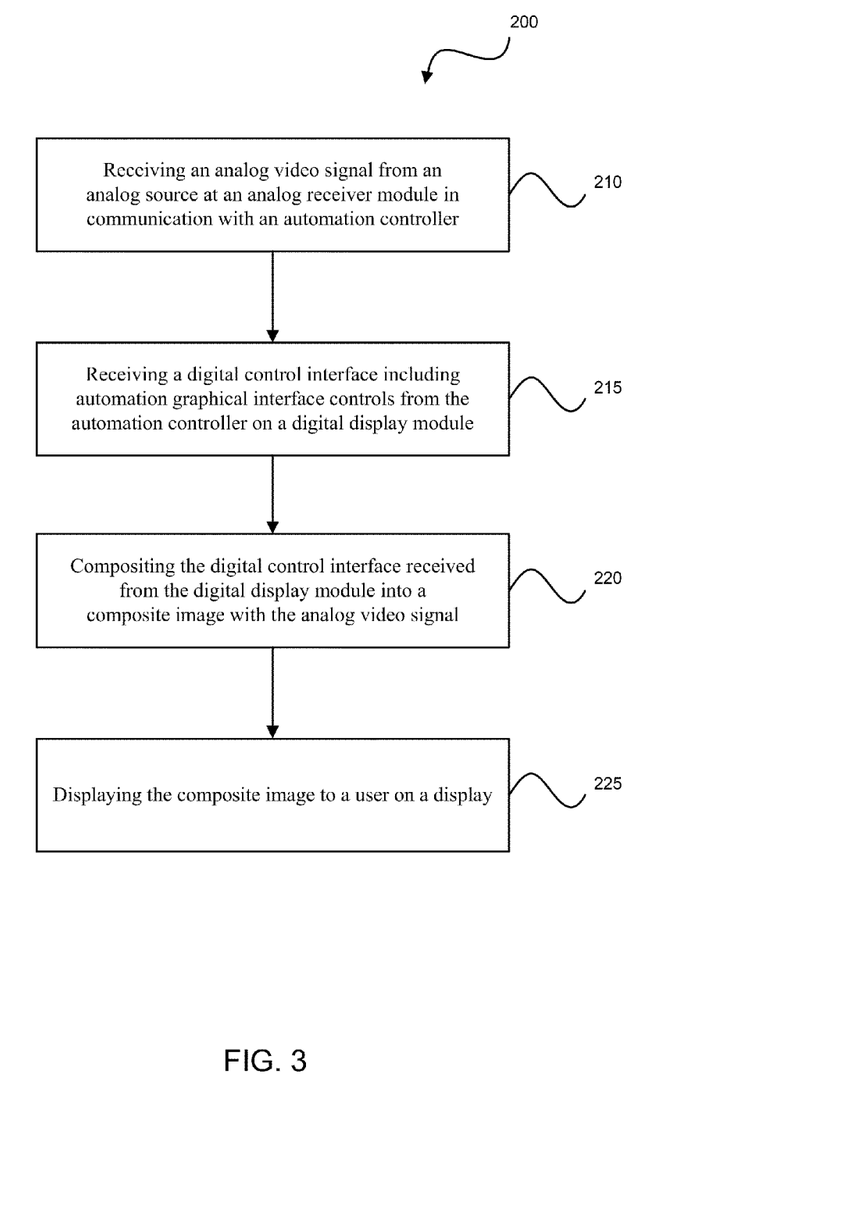
FIG. 3 is a flow diagram of a method for remote control of automation devices in accordance with an embodiment.

Referring to FIG. 3, a method 200 is shown for remote control of automation devices. An analog video signal is received 210 from an analog source at an analog receiver module in communication with an automation controller. A digital control interface including automation graphical interface controls is received 215 from the automation controller on a digital display module. The digital control interface received from the digital display module is composited 220 into a composite image with the analog video signal. The composite image is displayed 225 to a user on a display. The method can further include sending control signals via a motion sensitive input device to a communication port for the automation controller to control at least one automation device connected to a network. Multiple automation devices connected to the network can be controlled in this manner through the automation graphical interface controls using the motion sensitive input device. The method can include compositing a digital video signal into the composite image. In another aspect, the method includes compositing the analog video signal and digital control interface images together in a frame buffer before they are sent to the display.

In summary, embodiments of the present invention can help to simplify cost and operation of an automation network. By using a display module for overlaying digital and analog signals and using a simplified, motion-sensitive pointer device, many inputs can be viewed and managed via a display. The devices and digital/analog signals can be managed using an easily navigable menu system to streamline automation. Further, complicated, expensive, and/or confusing remote control devices can be avoided because the pointer device in the present system can be motion-sensitive and does not require the many input buttons used by prior devices.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An automation control system for control of electronic devices, comprising:

an automation controller comprising a communications port configured to provide control signals to control electronic devices via a network, wherein the electronic devices comprise lights and a video device, wherein the automation controller is a separate device than the lights and the video device;

an analog receiver module configured to receive analog video signals from analog sources;

a digital display module configured to receive a digital control interface from the automation controller, wherein the digital control interface includes automation graphical interface controls; and a display module coupled to the automation controller, the display module being configured to generate a composite image in a frame buffer by blending the digital control interface and the analog video signals together, the composite image comprising the digital control interface received from the digital display module and the analog video signals received from the analog receiver module, wherein the display module comprises an alpha blending module that adjusts transparency, wherein the digital control interface is provided to a digital frame buffer and the analog video signals are provided to an analog frame buffer that is a separate buffer from the digital frame buffer, wherein the digital frame buffer and the analog frame buffer are coupled to the alpha blending module wherein the transparency of at least one of a digital frame and an analog frame is adjusted, and wherein the digital control interface comprises control options for the lights including control options for dimming and turning on the lights.

2. A system as in claim 1, wherein the display module is configured to composite a digital signal into the composite image.

3. A system as in claim 1, further comprising a motion sensitive pointer configured to control a movement of a control icon for the digital control interface on a display.

4. A system as in claim 3, wherein the motion sensitive pointer includes a single user interface actuator that is a select button.

5. A system as in claim 3, wherein the motion sensitive pointer is configured to control the movement of a control icon on a display in a vertical and horizontal direction.

6. A system as in claim 3, wherein the motion sensitive pointer uses accelerometers to sense motion.

7. A system as in claim 3, wherein the motion sensitive pointer communicates with the automation controller wirelessly.

8. A system as in claim 1, wherein device automation controls, home entertainment controls, and analog video input controls are jointly controlled using graphical user interface (GUI) controls provided on a display.

9. A system as in claim 1, wherein the display module is a display screen viewable by a user.

10. A system as in claim 1, wherein the analog receiver module receives multiple analog inputs among which a user may select a desired analog input.

11. A system as in claim 10, wherein the multiple analog inputs can be selected from the group consisting of an analog optical disk input, an analog video tape input, an analog satellite television input, an analog cable television input, an analog television input from air transmission.

12. A system as in claim 1, further comprising a display configured to display the composite image to a user.

13. An automation control system for control of electronic devices, comprising:

an automation controller configured to control automation devices via a network, wherein the automation devices comprise lights and a video device, wherein the automation controller is a separate device than the lights and the video device;

a communication port for the automation controller, the communication port being configured to provide control signals for at least one automation device via the network;

an analog receiver module configured to receive analog video signals from external analog sources;

a digital display module configured to receive a digital control interface from the automation controller, wherein the digital control interface includes automation graphical interface controls;

a display module coupled to the automation controller, the display module being configured to generate a composite image in a frame buffer by blending the digital control interface and the analog video signals together, the composite image comprising the digital control interface received from the digital display module and the analog video signals received from the analog receiver module, wherein the display module comprises an alpha blending module that adjusts transparency, wherein the digital control interface is provided to a digital frame buffer and the analog video signals are provided to an analog frame buffer that is a separate buffer from the digital frame buffer, wherein the digital frame buffer and the analog frame buffer are coupled to the alpha blending module wherein the transparency of at least one of a digital frame and an analog frame is adjusted, and wherein the digital control interface comprises control options for the lights including control options for dimming and turning on the lights;

a display configured to display the composite image; and an accelerometer-based motion sensitive pointer device interfaced with the automation controller and configured to control movement of a control icon for the digital control interface on the display.

14. An automation control method for control of electronic devices, comprising:

receiving an analog video signal from an analog source at an analog receiver module in communication with an automation controller comprising a communications port configured to provide control signals to control electronic devices via a network, wherein the electronic devices comprise lights and a video device, wherein the automation controller is a separate device than the lights and the video device;

receiving a digital control interface including automation graphical interface controls from the automation controller on a digital display module;

generating, by a display module, a composite image in a frame buffer by blending the digital control interface and the analog video signals together, wherein the composite image includes the digital control interface received from the digital display module and the analog video signal received from the analog receiver module, wherein the display module comprises an alpha blending module that adjusts transparency, wherein the digital control interface is provided to a digital frame buffer and the analog video signals are provided to an analog frame buffer that is a separate buffer from the digital frame buffer, wherein the digital frame buffer and the analog frame buffer are coupled to the alpha blending module wherein the transparency of at least one of a digital frame and an analog frame is adjusted, and wherein the digital control interface comprises control options for lights including control options for dimming and turning on the lights; and displaying the composite image on a display.

15. A method as in claim 14, further comprising compositing a digital video signal into the composite image.

16. A method as in claim 14, further comprising sending control signals via a motion sensitive input device to the communication port for the automation controller to control at least one automation device connected to the network.

17. A method as in claim 16, further comprising controlling multiple electronic devices connected to the network through an automation graphical interface controls using a motion sensitive input device.

* * * * *